Patented Nov. 12, 1940

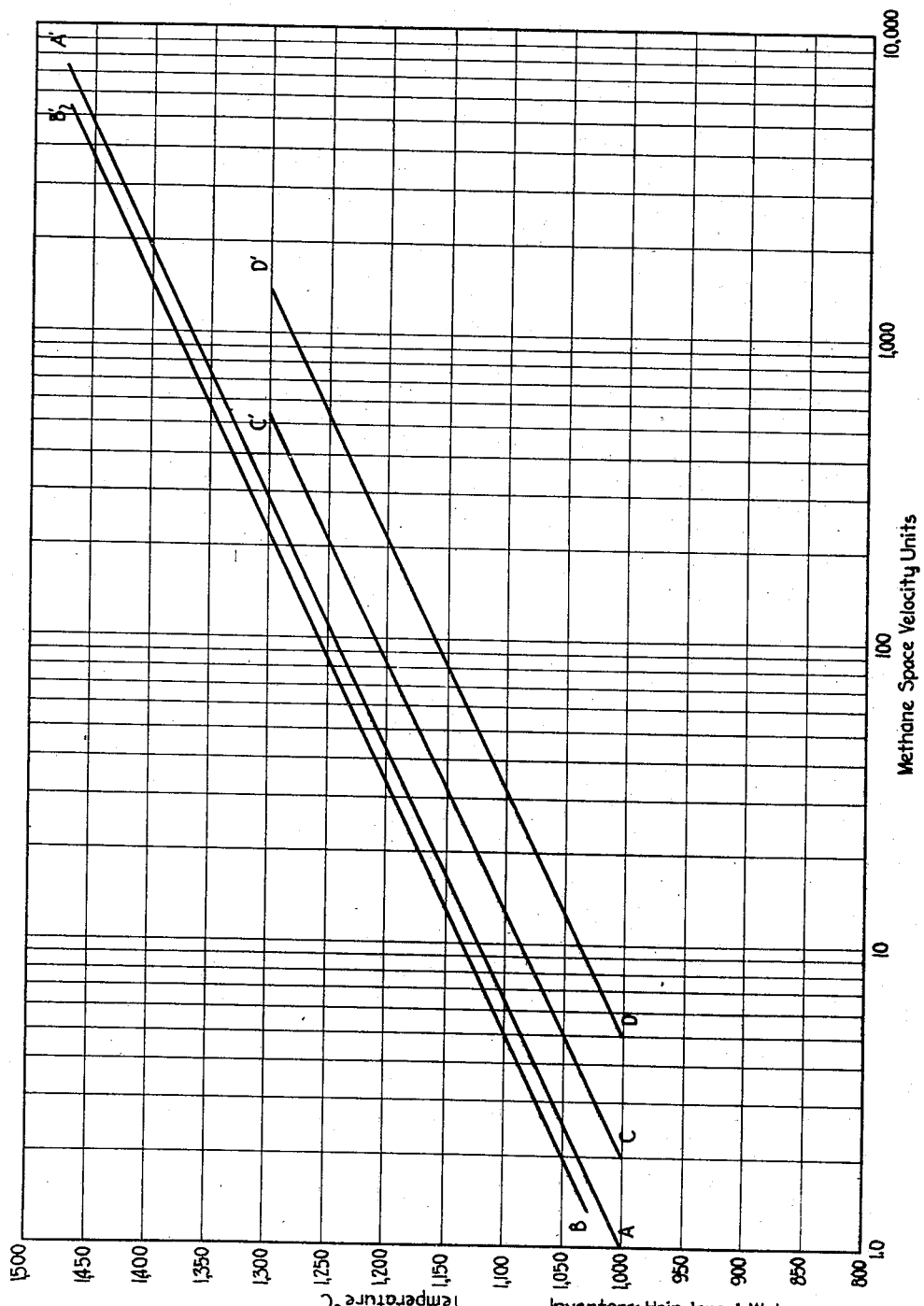

2,221,658

UNITED STATES PATENT OFFICE 2,221,658

PRODUCTION OF VALUABLE PRODUCTS FROM METHANE GASES

Hein Israel Waterman, Willem Jan Hessels, and Dirk Willem van Krevelen, Delft, Netherlands, assignors to Shell Development Company, San Francisco, Calif., a corporation of Delaware Application August 7, 1939, Serial No. 288,818 In the Netherlands August 23, 1938

7 Claims. (Cl. 260—673)

The present invention relates to the production of valuable products from methane-containing gases. More particularly, the invention relates to the production of benzol, ethylene, acetylene, and other valuable hydrocarbon products from methane.

Methane is available in enormous quantities in natural gases. Natural gases, by which term is meant those hydrocarbon-containing gases which originate from and are associated directly or indirectly with crude petroleum, are composed predominantly of methane and ethane, sometimes with smaller quantities of propane, butane, pentane and lesser amounts of higher hydrocarbons and inorganic gases, such as $CO_2$, $N_2$, $H_2S$, etc.

Such natural gases as contain propane, butane, and/or pentane, are called "wet" gases. These wet gases are quite valuable, since propane, butane, and pentane are much in demand and can be profitably removed from these gases, even when present in quite small amounts. Propane, for example, is readily dehydrogenated to propylene, which in turn is much in demand for the production of allyl chloride, allyl alcohol, glycerol, solvents, liquefied petroleum gas fuels, refrigerants and, especially, for the production of high anti-knock fuels by alkylation with iso-paraffins. Butane, likewise, is isomerized to iso-butane, dehydrogenated to iso-butylene, and is much in demand since these products are required in large quantities in the production of aviation gasoline, many chemical products, etc. Wet gases are, therefore, invariably treated to remove these valuable hydrocarbons. This is usually done by compression, absorption, or adsorption processes. After the removal of the higher hydrocarbons from the wet gas, the gas consists predominantly of methane, or methane with varying quantities of ethane. When it is considered that in 1937, for instance, over two billion gallons of propane, butane, etc. were recovered from wet gases, it is apparent that these stripped or artificially dried gases are available in exceedingly large quantities.

Aside from the large quantities of stripped or artificially dried gases available from the treatment of wet gases, there are even larger quantities of naturally-occurring dry gases composed of mixtures of methane and ethane. There are, moreover, many large fields in the so-called "methane areas" which yield gas in which methane is the only combustible component. Such fields are found, for instance, in Louisiana—Caddo Parish, De Soto Parish
California—Colusa, Fresno, Kern, Solano, Sutter Counties
Kansas—Montgomery County
Texas—Gulf District
Alabama—Choctaw, Clark, Fayette Counties
Arkansas—Crawford, Jefferson Counties
Illinois—Bureau, Crawford Counties
Mississippi—Adams, Covington, Jackson Counties
Montana—Chouteau, Fallon, Teton Counties
North Dakota—La Moure County
Oklahoma—Cotton, Osage Counties
Utah—Grand County Since the artificially dried gases from recovery plants, the naturally-occurring dry gases containing methane and ethane, and the gases from the methane areas in which methane is the only combustible component, contain no higher hydrocarbons, they are of no value for the recovery of natural gasoline products. In certain areas where these dry gases are available near industrial centers, a certain amount can be disposed of to supply the industrial and domestic needs at a relatively high return. In a few of the areas where the supply greatly exceeds the commercial demand for pipeline use, large amounts are burned in the production of carbon black. The gas used for the production of carbon black in the Panhandle area alone has been as high as one billion cubic feet per day. Gases containing an appreciable quantity of ethane are preferred for this purpose. Notwithstanding the amount of these dry gases used for pipeline use and the large amount used for carbon black production, larger quantities of these gases, especially those containing only methane, are blown into the air or burned in flambeaus, as there is at present no outlet except at prohibitive costs.

In view of the enormous quantities of methane in these gases, for which there is at present no profitable use, a large amount of work has been done in an endeavor to find a practical means of converting this methane into utilizable products. Numerous processes have been worked out whereby methane may be converted into valuable organic chemicals. These processes are, however, capable of utilizing only a small portion of the enormous quantities of gas available.

Despite the fact that the decomposition of methane is thermodynamically complete at a temperature of about 850° C., it is an exceedingly stable compound. Whereas, all hydrocarbons, with the exception of methane and ethane, are thermodynamically unstable at temperatures above about 200° C., methane can be used as an inert diluent in the pyrolysis of benzene at 700° C. The thermal decomposition of methane starts very slowly at temperatures of about 650-700° C. and becomes appreciable only at temperatures of about 900-1000° C., providing the time of heating is sufficiently long. This is shown in the following table:

TABLE I

*Thermal decomposition of methane*

| Temperature, °C. | Time | Percent methane in the reacted mixture |
|---|---|---|
| | | *Percent* |
| 480 | 6 days | 100 |
| 985 | 1 minute | 90.4 |
| 1015 | 60 minutes | 48.2 |
| 1150-60 | 1 minute | 44.6 |
| 1150-60 | 5 minutes | 27.25 |
| 1150-60 | 60 minutes | 22.3 |
| 1150-60 | 180 minutes | 9.15 |

The thermal decomposition of methane generally proceeds to the formation of carbon and hydrogen according to the reversible reaction:

$$CH_4 \rightleftharpoons C + 2H_2$$

At elevated temperatures this reaction tends to go to substantially complete decomposition of the methane. Thus, the equilibrium mixture contains:

0.36% methane at 1200° C.,
1.1% methane at 1000° C. and
2.5% methane at 850° C.

Franz Fischer, Brennstoff Chem. 9 309-316 (1928) and Brennstoff Chem. 13 (1932) found that if methane is subjected to temperatures in the order of 1,000° C. to 1,300° C. for much shorter times, the decomposition can be arrested before the reaction, according to the above equation, is completed. Under suitable conditions unsaturated residues, such as methyl radicals, ethylene, acetylene, are formed which polymerize or condense under the reaction conditions to give substantial yields of higher hydrocarbons, chiefly of aromatic character. The various factors involved in this method of converting methane into valuable liquid hydrocarbons were carefully investigated and the following generalizations found:

1. The thermal treatment of methane for short contact times leads to the production of hydrogen, ethylene, acetylene, a light oil consisting largely of benzene, a heavy oil or tar consisting mainly of high aromatic hydrocarbons, and carbon.

2. The contact time and the temperature are equally important and interrelated factors.

3. The temperature-time relation is a straight line function which can be expressed by a mathematical equation.

4. Generally speaking, contact times greater than one second lead to low yields of desirable products and high yields of carbon.

5. By increasing the temperature the contact time may be decreased. By so doing the yields of products, however, are gradually shifted, so that at the higher temperatures the yield of acetylene is increased at the expense of the yield of benzol.

6. Maximum yields of liquid hydrocarbons are obtained at temperatures between about 1,000° C. and 1,300° C.

7. The maximum yields are obtained under conditions at which about 20-30% of the methane is decomposed.

8. The maximum yield of low boiling hydrocarbons obtainable from methane by the process is about 0.3 gallon per thousand cubic feet. This is the most practical of the various processes suggested for the utilization of methane gases and is the only process so far found which appears capable of profitably utilizing any substantial quantity of the available dry gas. Although the process has been repeatedly studied and has been applied on a semi-technical scale, the yields of low boiling hydrocarbons (about 0.3 gallon per thousand cubic feet) are quite low and the process has not attained widespread application.

According to the present invention the conversion of methane to the more valuable hydrocarbons is effected by an induced reaction under different conditions. In order that our contribution in this field may be clearly understood and appreciated, it is necessary to devote special attention to the time factor. In the investigations of Franz Fischer and later investigators, the methane was passed at a suitable velocity through a tube or other reaction chamber of known volume heated externally by any suitable means to the desired reaction temperature. Knowing the volume of the reaction chamber, the temperature, and the weight of methane treated in any given time, previous investigators have attempted to calculate the time of reaction and have reported the results of these computations as the "contact time" (or "space velocity") at which the methane was treated. Thus, for instance, if 90 grams of methane were passed in five hours through a reaction zone of 5 c. c. volume, (i. e. 5 c. c. of the reactor space assumed to be within the arbitrarily fixed temperature limits) heated to 1,200° C., the "contact time" has usually been calculated as follows:

$$\text{"Contact Time"} = \frac{5}{\frac{1000 \times 90 \times 22.4 \times 1473}{16 \times 5 \times 60 \times 60 \times 273}} = 0.132 \text{ second}$$

Such calculations give purely arbitrary figures which may be properly employed in comparing results of a series of comparative experiments, but are clearly no indication of the true average contact time. Thus, while all investigators agree that the contact time is extremely important and must be closely adjusted at any given temperature to obtain a certain result, equivalent results obtained by different investigators at the same temperature are claimed to be obtained at widely different "contact times." This is due to the impossibility of accurately calculating the average time of contact in this crude manner. Under the conditions employed, the temperature of the reaction vessel is difficult to determine accurately, and the volume of the reaction vessel which is "at temperature" can only be very roughly approximated. Furthermore, the volume assumed for that portion of the reaction vessel which is "at temperature" depends upon an arbitrary choice of allowable temperature difference. Furthermore, under the conditions employed, all of the gas is not evenly heated to the maximum temperature (measured on the outside of the reaction vessel), and the volume of gas at the reaction temperature, calculated according to the gas laws, may be considerably in error.

The contact time, furthermore, depends upon the character of the inner and outer surface of the reaction chamber, the heat conductivity of the reactor material, the dimensions of the reactor, the presence of diluents in the gas treated, the amount of expansion of the gas volume during reaction, etc. As a result of all these various factors, the "contact time", calculated as above shown, cannot be expected to indicate the true mean contact time, nor to be comparable with different apparatus, operators, etc.

In order to clearly indicate the conditions which we have found more advantageous for the execution of the present process, the true contact time is hereinafter expressed in terms of an arbitrary unit called the "methane space velocity unit." If methane is passed at a very fast rate through a reaction tube heated to a given temperature, no appreciable reaction takes place. If the rate of throughput (calculated from the weight of methane applied per unit of time) is gradually decreased, a definite and easily recognizable point is reached at which the decomposition of the methane is visually apparent by the beginning of the formation of a slight fog. The fog or mist is probably due to traces of tar which have been shown to be invariably formed in the thermal decomposition of methane. This space velocity at which methane gives the first visual indication of decomposition (as seen in the issuing gas) at a temperature of 1000° C., and essentially atmospheric pressure is arbitrarily designated as one methane space velocity unit. If this space velocity (or contact time) is designated as one methane space velocity unit, then it is found that at temperatures of 1065, 1120, 1210, etc. the methane space velocity units at which decomposition of the methane is first visually noticed are 3.3, 9.4, and 50 respectively. If the logarithms of the methane space velocity units are plotted against the temperatures in degrees centigrade, the points fall essentially on a straight line. This line, which indicates the respective conditions of space velocity and temperature at which the decomposition of methane is first visually noticed, is shown as line A—A' in the accompanying graph. Thus, under all conditions falling above and to the left (at higher temperatures and lower space velocities) of line A—A', methane is pyrolyzed, and, under all conditions falling below and to the right (at lower temperatures and higher space velocities) of line A—A', the pyrolysis of methane practically does not take place.

The line B—B' in the accompanying graph represents the conditions of temperature and space velocity (expressed as methane space velocity units) at which methane is thermally decomposed to an extent of 15%. Since in previous investigations the conditions for the best yields have always been severe enough to react at least 15% of the methane, it is obvious that these conditions are confined to that area above the line B—B', and most certainly above the line A—A'. Thus, Smith, Grandone and Rall, who made a careful study of the Fischer process, (U. S. Bur. of Mines Rept. R. I. 3143, and Nat. Pet. News, page 69, Oct. 28, 1931), claim that the optimum yield of benzene is obtained when, at a given temperature, only sufficient time is allowed for approximately 25% by weight of the methane to be decomposed (U. S. Pat. No. 2,061,597). These conditions would be represented on the accompanying graph by a line approximately parallel to and above line B—B'.

We have found that methane may be converted to benzol and other valuable hydrocarbons by an induced reaction under different conditions with an equally good yield of liquid hydrocarbon products and a much greater production rate. The induced conversion of methane to benzol and other valuable hydrocarbons, according to the present invention, is executed at substantially atmospheric pressure under conditions at which methane itself would undergo no, or substantially no, reaction. Thus, the present process is executed under conditions of temperature and space velocity falling in the area below A—A'. Indeed, the present process may be advantageously executed under conditions considerably (35 to 85° C.) below those represented by line A—A', such, for example, as those represented in the area between lines C—C' and D—D' in the accompanying graph.

In the presence of certain inductors and under otherwise suitable conditions, methane may be induced to react to give excellent yields of benzol and other valuable hydrocarbons under conditions considerably less severe than those generally required to effect an appreciable amount of reaction of methane. The property of inducing the formation of benzol and valuable hydrocarbons from methane, we have found, is possessed by a large number of thermally less stable compounds. One group of compounds which we have found to be very effective is, for instance, the higher aliphatic hydrocarbons. The effectiveness of these compounds is, in general, somewhat dependent upon the ease with which they are thermally decomposed and, hence, upon their molecular weight. Thus, for example, ethane, which is nearly as thermally stable as methane, is not an inductor; propane may act as an inductor if used in sufficient quantities under favorable conditions; butane is a fairly good inductor; and saturated and unsaturated aliphatic hydrocarbons having four or more carbon atoms are the best inductors. While it is known that methane containing an appreciable quantity of ethane produces a greater yield of liquid hydrocarbons than pure methane, these results are obtained under conditions more severe than those represented by the line A—A' and are not in any way connected with the phenomena of induced methane conversion. The yields of low boiling liquid hydrocarbons obtainable from the thermal treatment of aliphatic hydrocarbons is known to be much higher for the hydrocarbons higher than methane. Thus, for example, the following yields of low boiling liquid hydrocarbons may be obtained per thousand cubic feet of the vapors of the following pure hydrocarbons:

| | Gallons |
|---|---|
| Methane | 0.3 |
| Ethane | 1.5 |
| Propane | 2.4 |
| Butane | 3.4 |
| Ethylene | 2.4 |
| Propylene | 4.0 |
| Butylene | 5.1 |

The inductive action of a few of the many applicable aliphatic saturated and unsaturated hydrocarbons is illustrated in the following examples.

EXAMPLE 1

To an industrial, dry methane gas containing 91.3% methane, 5.1% nitrogen, 0.2% higher hydrocarbons, 3.4% hydrogen and traces of other gases, there was added 4.75% by volume of a commercial butane fraction. Upon passing the mixture (containing 4.55% butane) through a reaction tube maintained at 1170° C. at a rate of 53 methane space velocity units, 4.25% of the methane applied was induced to react. In the absence of the added butane, the methane gas undergoes substantially no change upon being subjected to the same treating conditions.

EXAMPLE 2

3.33% by volume of ethylene was added to a dry methane gas. Upon passing the gas mixture through a reaction tube maintained at 1170° C. at a rate of 62 methane space velocity units, only about 1% of the methane was induced to react. It is, therefore, seen that ethylene exerts only a very slight inductive action.

EXAMPLE 3

2.42% by volume of a mixture of equal parts of hexane and heptane was added to a dry methane gas. Upon passing the mixture through a reaction tube maintained at 1170° C. at a rate of 47 methane space velocity units, 6% of the methane was induced to react. Thus, it is seen that the higher aliphatic hydrocarbons induce a large amount of methane to react under conditions of temperature and time where methane is normally unaffected.

EXAMPLE 4

3.33% by volume of benzene ($C_6H_6$) was added to a dry methane gas. Upon passing the gas mixture through a reaction tube maintained at 1170° C. at a rate of 54 methane space velocity units, no reaction of the methane was detected. Thus, it is seen that benzene has no inductive action and that methane does not react under the prevailing conditions.

EXAMPLE 5

2.56% by volume of butadiene was added to a dry methane gas. Upon passing the gas mixture through a reaction tube maintained at 1170° C. at a rate of 48 methane space velocity units, 8% of the methane was induced to react. This is illustrative of the inductive action of the higher unsaturated aliphatic hydrocarbons.

Another group of compounds which we have found are capable of inducing formation of liquid hydrocarbons from methane under conditions less severe than those represented by the line A—A' are the halogenated hydrocarbons, such, for example, as $CH_3Cl$, $CH_2Cl_2$, $CHCl_3$, $CCl_4$ and the halogenated derivatives of ethane, propane, butane, pentane, ethylene, propylene, butylene, amylene, toluene, and the like higher hydrocarbons.

The use of halogenated hydrocarbons as inductors in the treatment of dry methane gas by induced reaction is illustrated by the following examples:

self by introducing a small amount of chlorine or bromine into the methane gas being treated, either prior or during reaction. This is illustrated by the following examples:

|  | Example number | | |
|---|---|---|---|
|  | 13 | 14 | 15 |
| Inductor employed | None | $Cl_2$ | $Br_2$ |
| Amount of inductor, percent by volume | 0 | 10.5 | 7.7 |
| Temperature, °C | 1165 | 1169 | 1170 |
| Space velocity in methane units | 44 | 44 | 57 |
| Methane induced to react, percent | <0.05 | 12 | 11 |

Generally speaking, methane may be induced to react by the presence of any hydrocarbon or hydrocarbon derivative containing at least three carbon atoms which, under the conditions represented by the line A—A' is substantially pyrolyzed. Thus, sulfur derivatives, such as mercaptanes, sulfides and disulfides can also be employed. These less preferred inductors may be directly added to the methane or methane-containing gas or may be formed in the reaction system. The use of sulfur compounds as inductors is illustrated by the following example:

EXAMPLE 16

3.5% by volume of dimethyl sulfide, $(CH_3)_2S$, was added to methane. Upon passing this mixture through a reaction tube maintained at 1170° C. at a rate of 56 methane space velocity units, 7% of the methane was induced to react. No appreciable reaction is noticed under these conditions in the absence of an inductor.

The ability of certain materials to induce methane to react, within a limited range of conditions under which methane is normally stable, is quite surprising. Although experimental evidence indicates that the mechanism of the induced reaction is not the same for all inductors, and that the halogenated inductors react in a different manner than the higher hydrocarbons, the present invention is not limited whatsoever to the soundness or accuracy of any theories, and no attempt is herein made to explain the mechanism of the reaction or reactions involved. Compounds known to form free radicals, such as tetraethyl lead and sodium vapors, were found to exert no effect. Catalysts and free oxygen were found to be detrimental. However, oxygen, when combined in organic compounds such as acetone, isopropyl alcohol, etc., is not, in general, detrimental, and these compounds may act as inductors.

In order that the methane shall be induced to react, it is important that the inductor be employed within certain limits of concentration. If the concentration of the inductor is too low or too high, very little or none of the methane is induced to react. This is illustrated by the

|  | Example number | | | | | | |
|---|---|---|---|---|---|---|---|
|  | 6 | 7 | 8 | 9 | 10 | 11 | 12 |
| Inductor employed | None | $CH_3Cl$ | $CH_2Cl_2$ | $CHCl_3$ | $CCl_4$ | $C_2H_5Cl$ | $C_2H_4Cl_2$ |
| Amount of inductor, percent by volume | 0 | 9.6 | 5.2 | 4.9 | 1.96 | 2.1 | 5.9 |
| Temperature, °C | 1165 | 1169 | 1171 | 1169 | 1169 | 1172 | 1170 |
| Space velocity in methane units | 44 | 55 | 53 | 49 | 68 | 54 | 59 |
| Methane induced to react, percent | <0.05 | 6 | 10 | 13 | 7 | 6.1 | 9.5 |

The halogenated hydrocarbons, if used, may be applied as such or may be formed directly in a preheating chamber or the reaction chamber itself by introducing a small amount of chlorine or bromine into the methane gas being treated, either prior or during reaction. This is illustrated by the following examples showing the results of experiments made by passing a dry methane gas containing varying amounts of inductor through a heated reaction tube under conditions at which methane is not normally affected.

|  | Example number | | | | | | |
|---|---|---|---|---|---|---|---|
|  | 17 | 18 | 19 | 20 | 21 | 22 | 23 |
| Inductor employed | None | $CH_2Cl_2$ | $CH_2Cl_2$ | $CH_2Cl_2$ | $CH_3Cl$ | $CH_3Cl$ | $CH_3Cl$ |
| Amount of inductor percent by volume | 0 | 0.83 | 2 | 5 | 9.6 | 33 | 76 |
| Temperature °C | 1165 | 1170 | 1170 | 1170 | 1169 | 1162 | 1162 |
| Space velocity in methane units | 44 | 56 | 51 | 56 | 55 | 61 | 54 |
| Methane induced to react-percent | 0 | 4 | 8 | 8 | 6 | 0 | 0 |

The allowable limits of concentration of inductor which may be employed in the methane treated to induce the reaction of methane according to the present invention, depends somewhat upon the particular inductor employed and upon various factors, such as the reaction conditions, the amount of inert diluent, if any, in the methane gas, etc., and may vary considerably. In general, the concentration of inductor is between about 0.5 and 12% and preferably between about 1% and 10%.

The inductor may be added to the methane gas either prior to or during the reaction in any convenient manner such, for instance, as by contacting the methane gas with the liquid inductor maintained at a suitable temperature. In the case of gaseous inductors these may be added directly to the gas stream in the requisite quantities. Aside from directly adding a higher aliphatic hydrocarbon to dry methane gas, excellent mixtures of methane gas and higher hydrocarbon inductors may be obtained directly from recovery plants (compression, adsorption, and absorption plants) by simply adjusting the recovery process so that the stripped or artificially dried exit gas contains the desired concentration of higher hydrocarbons. Another excellent way of preparing suitable mixtures of methane and hydrocarbon inductors is to blend the dry methane gas with a suitable proportion of "wet gas". When halogenated hydrocarbons are used as inductors the actual consumption of inductor may be quite small. Thus, if ethyl chloride is used, for example, the HCl liberated during the reaction may be recombined with the ethylene which is also formed to a certain extent during the reaction, and reused. In this way the ethyl chloride may be recycled in the process.

As mentioned above, the phenomena of induced methane reaction is found to take place only within a limited temperature range. For the sake of comparison, experiments wherein the temperatures employed were within the preferred narrow-range of 1160 to 1180° C. were chosen for the foregoing examples. While, in general, the induced reaction is most pronounced within the temperature range of about 1100° C. to 1210° C., the induced reaction of methane may be effected at somewhat higher and lower temperatures if the space velocity is properly adjusted. As the temperature is raised while the space velocity is maintained constant, the amount of methane reacted by induced reaction decreases sharply as soon as the conditions become sufficiently severe to cause normal thermal decomposition. This is illustrated by the following examples showing results of experiments on the conversion of methane in the presence of inductors at several temperatures.

|  | Example number | | | |
|---|---|---|---|---|
|  | 24 | 25 | 26 | 27 |
| Inductor employed | $C_2H_5Cl$ | $C_2H_5Cl$ | $C_2H_5Cl$ | $C_2H_5Cl$ |
| Amount of inductor percent by volume | 2.15 | 2.86 | 2.13 | 2.35 |
| Temperature °C | 1172 | 1205 | 1210 | 1230 |
| Space velocity in methane units | 54 | 64 | 62 | 62 |
| Methane converted by induced reaction percent | 6.1 | 6.0 | 7 | 2.8 |

From these examples it is seen that under conditions where pyrolysis of methane takes place in the absence of an inductor (Example 27), the induced reaction does not take place to any practical extent. Under conditions where the best yields of liquid hydrocarbons are formed by normal thermal treatment of methane, the induced reaction is absent. By suitably shortening the time of heating by increasing the space velocity, methane may be converted by induced reaction at temperatures up to about 1300° C. Since, however, even with the most favorable space velocity, considerably higher yields of gaseous hydrocarbons are formed at the expense of the yields of liquid hydrocarbons, the process is preferably executed at temperatures below about 1210° C.

In order to induce the reaction of methane at lower temperatures, it is necessary to prolong the time of contact by decreasing the space velocity. This may be done, in general, down to a temperature of about 1000° C. Below about 1000° C. the induced reaction cannot be made to take place to any appreciable extent. Thus, when passing methane containing 12.5% of $C_2H_5Cl$ through a reaction tube heated to 900° C. at a rate of 2 methane space velocity units (calculated "contact time" 1.7 sec.) no induced reaction of methane was observed.

The space velocity (contact time) of the methane-containing feed is so adjusted, according to the present process, that at the temperature employed, the conditions are not sufficiently severe to effect any appreciable thermal decomposition of methane, i. e. below the line A—A'. Surprisingly enough, it is found that if the conditions are adjusted sufficiently severe to fall above line A—A' the phenomena of induced reaction drops sharply or disappears completely and straight thermal decomposition of the methane and inductor take place side by side, the amount of methane reacting being substantially the same as that which would be obtained if no inductor were present. As the space velocity is lowered (contact time increased) while maintaining conditions suitable for induced reaction of the methane, the yield of liquid hydrocarbon is, in general, increased. At space velocities higher than necessary to provide the necessary conditions for induced reaction, the yield of total products is, in general, lower and the percentage of gaseous products, particularly ethylene, in the product is higher. This is illustrated by the following examples showing the results of experiments on the treatment of a methane gas, to which 1.65% by volume of octane was added, at 1170° C.

|  | Example number | | | |
|---|---|---|---|---|
|  | 28 | 29 | 30 | 31 |
| Space velocity in methane units | 74 | 66 | 58 | 49 |
| Gaseous reaction products in the product percent | 55 | 53 | 50 | 47 |
| Non-gaseous reaction products in the product percent | 45 | 47 | 50 | 53 |
| Relative total yields of products | .75 | .78 | .90 | 1.00 |

For the temperature range of 1000° C. to 1300° C. the space velocity may vary from about 2 to about 1000 methane units. For the more preferred temperatures of from about 1100° C. to 1210° C. the space velocity is usually between about 6 and about 250 methane units.

Under the above-described conditions of temperature and space velocity, which we have found applicable for the induced reaction of methane, the percentage of the total applied methane which undergoes reaction (the "conversion") is usually less than about 15% and usually varies between about 4 and 12% per pass, depending upon the inductor employed, the concentration of the inductor, the reaction conditions, etc. Hydrogen, if present to an appreciable extent in the gas mixture to be treated, materially decreases the conversion of the methane but does not, in general, materially affect the relative proportions of gaseous and liquid products. Nitrogen and other inert gases, when present in large amounts in the gas mixture to be treated, decrease the conversion somewhat and may increase the proportion of acetylene in the product.

In the present process, as in the above-described normal pyrolysis of methane, the formation of liquid hydrocarbon products depends upon heating the methane for such short times that the normal decomposition to carbon and hydrogen is arrested before it can go to completion, and yet at times sufficiently long to allow the formation of liquid products by secondary reactions. To obtain the maximum yields of liquid products, very short and accurately controlled contact times must, therefore, be provided. Since, in order to maintain these optimum conditions, the conversion of methane per pass is, according to the present process, usually less than 15%, it is desirable and economical to subject the gaseous reaction product, preferably after recovering the non-gaseous reaction products, to one or more further treatments. Since, under the preferred conditions of the present process, the inductor is, in general, only about from about 50 to 80% reacted in one pass through the reaction zone, it is not usually necessary to add further quantities of inductor when retreating the gases. In some cases the addition of further amounts of inductor may, however, be desirable. The retreatment of the once-treated gases not only allows the methane to be more completely reacted but also allows the unsaturated gases, (ethylene and acetylene) which are invariably formed, to be converted into more valuable liquid products. The results obtainable by retreating the exit gases (after separating the nongaseous products) are illustrated by the following examples:

EXAMPLE 32

A dry methane gas to which had been added 2.4% by volume of a mixture of hexane and heptane was passed through a reaction tube maintained at 1170° C. at a rate of 47 methane space velocity units, whereupon 9% of the methane was induced to react. The total product contained:

| | Percent |
|---|---|
| Tar+carbon | 23 |
| Light boiling hydrocarbons (75% $C_6H_6$) | 27 |
| Ethylene | 25 |
| Acetylene | 25 |

When the non-gaseous products were removed after each treatment and the gases retreated, a total of 24% of the methane was induced to react in five treatments. The total product contained:

| | Percent |
|---|---|
| Tar and carbon | 31 |
| Light boiling hydrocarbons | 49 |
| Ethylene | 8 |
| Acetylene | 12 |

The conversion of the methane into valuable liquid hydrocarbons upon repeated treatment of the exit gases after removing the non-gaseous products continually drops as the exit gas becomes less concentrated in methane and more concentrated in ethylene, acetylene, hydrogen, etc. This is illustrated by the following examples wherein propane and butane were added to methane and quantities of the gas mixtures were treated five times in total at a temperature of 1170° C. and a rate of 57 methane space velocity units while removing the non-gaseous products after each treatment.

|  | Example number | | |
|---|---|---|---|
|  | 33 | 34 | 35 |
| Amount of inductor, percent by volume | 0 | 14.2 | 3.1 |
| Analysis of feed: | | | |
| Methane | 100 | 85.8 | 96.9 |
| Propane | 0 | 7.5 | 1.7 |
| Butane | 0 | 6.7 | 1.4 |
| Temperature °C | 1170 | 1170 | 1170 |
| Space velocity in methane units | 57 | 57 | 57 |
| Methane induced to react percent | About 3 | 12 | 20.5 |
| Analysis of the product: | | | |
| Tar and carbon | | 36 | 24 |
| Light boiling hydrocarbons | | 39 | 45 |
| Ethylene | | 11 | 11 |
| Acetylene | | 14 | 20 |

Of the light boiling hydrocarbons formed, about 35% was formed in the first pass, 25% in the second pass, 15% in the third pass and 12% in the fourth and fifth passes. These experiments also illustrate the relatively weak inductive action of propane and the detrimental effect of excess inductor.

In many cases it will be desirable to remove some or all of these reaction products from the reacted gases. Thus, for example, the acetylene, which is very valuable, may be removed and recovered by conventional methods and the ethylene may be converted into valuable liquid hydrocarbons by catalytic polymerization under pressure or by chemical treatment, such as alkylation, etc. If it is not desired to recover these unsaturated gases from the gaseous reaction product, the gases may be utilized for producing carbon black or hydrogen. Since these gases are equivalent, if not superior, to the original untreated gas for carbon black production, the present process may be employed in conjunction with the production of carbon black and a more efficient utilization of the methane thereby realized.

The present process may be applied to methane or methane-containing gases, including those containing methane with small amounts of other hydrocarbons and/or inert gases. It is, however, especially applicable and advantageous for the treatment of the large available quantities of natural gases containing methane as the only combustible constituent and those natural and artificially stripped gases composed of methane with a lesser quantity of ethane. Wet gases are not applicable unless first diluted with dry gas to bring the higher hydrocarbons to the requisite concentration. The present process employing the induced methane reaction is distinctly more advantageous for the utilization of these gases than the hitherto proposed non-induced pyrolysis processes. Whereas the ordinary non-induced pyrolysis of methane gives the best yields of low boiling liquid hydrocarbons over a range of space velocities covering approximately 20 to 30% conversion of the methane, the present induced reaction gives the maximum yield of low boiling liquid hydrocarbons over a comparatively narrow range of much higher space velocities. Thus, whereas at 1190° C. a maximum yield of low boiling liquid hydrocarbons is obtained in four passes by normal pyrolysis of methane at space velocities of from about 10 to about 18 methane units, an equal, or slightly better, yield of low boiling liquid hydrocarbons may be obtained, for instance, at 1190° C. and four passes by the induced reaction at space velocities of from about 38 to about 68 methane units. Thus, it is seen that by the present process an equal yield of low boiling liquid hydrocarbons may be obtained while the production capacity of the reactor is increased at least 300%.

We claim as our invention:

1. A process for the production of liquid hydrocarbon products from methane, which comprises subjecting methane in the presence of from 0.5 to 12 mol per cent of an aliphatic hydrocarbon containing at least four carbon atoms to a thermal treatment for a time corresponding to a rate of from 2 to about 1000 methane space velocity units and at a temperature below the temperature of the first visual decomposition of methane at the same space velocity, said temperature being at least 1000° C. and not greater than 1300° C., whereby a portion of the methane is induced to react to give largely aromatic hydrocarbons.

2. A process for the production of liquid hydrocarbon products from methane, which comprises subjecting methane in the presence of from 1 to 12 mol per cent of an aliphatic hydrocarbon containing at least three carbon atoms to a thermal treatment for a time corresponding to a rate of from 2 to about 1000 methane space velocity units and at a temperature below the temperature of the first visible decomposition of methane at the same space velocity, said temperature being at least 1000° C. and not greater than 1300° C. whereby a portion of the methane is induced to react to give largely aromatic hydrocarbons.

3. A process for the production of liquid hydrocarbon products from methane, which comprises subjecting methane in the presence of from 0.5 to 12 mol per cent of a halogenated hydrocarbon to a thermal treatment for a time corresponding to a rate of from 2 to about 1000 methane space velocity units and at a temperature below the temperature of the first visible decomposition of methane at the same space velocity, said temperature being at least 1000° C. and not greater than 1300° C. whereby a portion of the methane is induced to react to give largely aromatic hydrocarbons.

4. A process for the production of liquid hydrocarbon products from methane, which comprises subjecting methane in the presence of from 0.5 to 12 mol per cent of a halogen derivative of ethylene to a thermal treatment for a time corresponding to a rate of from 2 to about 1000 methane space velocity units and at a temperature below the temperature of the first visible decomposition of methane at the same space velocity, said temperature being at least 1000° C. and not greater than 1300° C. whereby a portion of the methane is induced to react to give largely aromatic hydrocarbons.

5. A process for the production of liquid hydrocarbon products from methane, which comprises subjecting methane in the presence of from 0.5 to 12 mol per cent of a thermally less stable inductor to a thermal treatment for a time corresponding to a rate of from 2 to about 1000 methane space velocity units and at a temperature of from 35 to 85° C. below the temperature of the first visible decomposition of methane at the same space velocity, said temperature being at least 1000° C. and not greater than 1300° C., whereby a portion of the methane is induced to react to give largely aromatic hydrocarbons.

6. A process for the production of liquid hydrocarbon products from methane, which comprises subjecting methane in the presence of from 0.5 to 12 mol per cent of a thermally less stable inductor to a thermal treatment for a time corresponding to a rate of from 2 to about 1000 methane space velocity units and at a temperature below the temperature of the first visible decomposition of methane at the same space velocity, said temperature being from 1100° C. to 1210° C. whereby a portion of the methane is induced to react to give largely aromatic hydrocarbons.

7. A process for the production of liquid hydrocarbon products from methane, which comprises subjecting methane in the presence of from 0.5 to 12 mol per cent of a thermally less stable inductor to a thermal treatment for a time corresponding to a rate of from 2 to about 1000 methane space velocity units and at a temperature below the temperature of the first visible decomposition of methane at the same space velocity, said temperature being at least 1000° C. and not greater than 1300° C., whereby a portion of the methane is induced to react to give largely aromatic hydrocarbons.

HEIN ISRAEL WATERMAN.
WILLEM JAN HESSELS.
DIRK WILLEM van KREVELEN.